(12) United States Patent
Luo et al.

(10) Patent No.: US 11,318,647 B2
(45) Date of Patent: May 3, 2022

(54) METHOD OF MICROCELLULAR FOAM MOLDING

(71) Applicant: Dongguan Hailex New Material Science and Technology Co., Ltd, Dongguan (CN)

(72) Inventors: Zhenhuan Luo, Guangdong (CN); Fuqi Liu, Guangdong (CN)

( * ) Notice: Subject to any disclaimer, the term of this patent is extended or adjusted under 35 U.S.C. 154(b) by 177 days.

(21) Appl. No.: 16/172,858

(22) Filed: Oct. 29, 2018

(65) Prior Publication Data

US 2019/0061211 A1 Feb. 28, 2019

(51) Int. Cl.
| | |
|---|---|
| *B29C 44/34* | (2006.01) |
| *B29K 105/04* | (2006.01) |
| *B29K 105/24* | (2006.01) |
| *C08J 9/12* | (2006.01) |
| *B29K 23/00* | (2006.01) |

(52) U.S. Cl.
CPC ........ *B29C 44/348* (2013.01); *B29C 44/3403* (2013.01); *B29C 44/3415* (2013.01); *B29C 44/3446* (2013.01); *B29C 44/3488* (2013.01); *B29C 44/355* (2013.01); *C08J 9/122* (2013.01); *B29K 2023/0633* (2013.01); *B29K 2023/083* (2013.01); *B29K 2023/12* (2013.01); *B29K 2105/041* (2013.01); *B29K 2105/24* (2013.01); *C08J 2201/026* (2013.01); *C08J 2203/08* (2013.01); *C08J 2205/044* (2013.01); *C08J 2300/22* (2013.01); *C08J 2300/26* (2013.01)

(58) Field of Classification Search
CPC ... B29C 44/02; B29C 44/3415; B29C 44/348; B29C 44/3484; B29C 44/3488; B29C 44/3403; B29C 44/3446; B29C 44/3453; B29C 44/35; B29C 44/355; B29K 2023/06; B29K 2023/0633; B29K 2023/083; B29K 2023/12; B29K 2105/041; B29K 2105/24; C08J 9/122; C08J 2201/026; C08J 2201/032; C08J 2203/06; C08J 2203/08; C08J 2205/044; C08J 2300/22; C08J 2300/26
See application file for complete search history.

(56) References Cited

U.S. PATENT DOCUMENTS

| | | | | |
|---|---|---|---|---|
| 4,166,890 A | * | 9/1979 | Fried | ........... C08J 9/0023 521/92 |
| 6,169,122 B1 | * | 1/2001 | Blizard | ............. B29C 44/08 521/79 |
| 10,850,434 B2 | * | 12/2020 | Darland | ........... B29C 44/3453 |

(Continued)

*Primary Examiner* — Michael A Tolin
(74) *Attorney, Agent, or Firm* — Novoclaims Patent Services LLC; Mei Lin Wong

(57) ABSTRACT

A method of microcellular foam molding an article is provided with filling a mold with a polyolefin compound; forming crosslinks in the mold to obtain a crosslinked mold; dissolving a supercritical fluid into the crosslinked mold under a predetermined pressure and at a predetermined temperature for a predetermined period of time to obtain a second mold configured to allow the supercritical fluid to effuse through; and heating the second mold at a second predetermine temperature for a predetermined foaming time until a foamed article is finished in the second mold. A second embodiment involves using elastomers as foaming materials is also provided.

7 Claims, 2 Drawing Sheets

(56) References Cited

U.S. PATENT DOCUMENTS

2004/0080070 A1\* 4/2004 Liu ................... B29C 44/3453
264/51
2017/0130023 A1\* 5/2017 Yeh ......................... C08J 9/122
2019/0002662 A1\* 1/2019 Baldwin ................ B29C 44/24

\* cited by examiner

METHOD OF MICROCELLULAR FOAM MOLDING

BACKGROUND OF THE INVENTION

1. Field of the Invention

The invention relates to microcellular foam and more particularly to a method of microcellular foam molding an article having improved characteristics.

2. Description of Related Art

Physical or chemical foaming agents are added to polymeric foaming materials to form bubbles therein. The foaming process comprising the steps of forming gas bubbles, nucleation, and stabilization. Typically, gas under high pressure is dissolved into various polymers, relying on thermodynamic instability phenomena to cause the uniform arrangement of the gas bubbles.

Microcellular foam and their methods of manufacturing has become more standardized and improved upon since late 1970s. Trexel Inc. is often referred to as the industry standard for microcellular foam with their use of MuCell® Molding Technology which is characterized by connecting a device containing a supercritical fluid (SCF) to an injection molding machine (or extrusion machine), introducing the SCF into the injection molding machine (or extrusion machine) to mix with polymers, and injecting the mixture into a mold. An article is produced after cooling the mold.

However, the conventional MuCell® Molding Technology has the following disadvantages: greater specific gravity (e.g., more than 0.4), low resilience, poor touch feeling, irregularities on the surface, and being not appropriate for the production of shoes, mats and exercise equipment. Further, using paraffin such as butane, pentane, or hexane or chemical compounds having a lower evaporation temperature as foaming agent is not environment-friendly. Furthermore, conventionally, polyolefin compound or elastomers are foamed externally of a mold prior to placing in the mold. This manufacturing process is time consuming, tedious and not economical.

Still conventionally, foaming internally of a mold has the following disadvantages: springs or the like being liable to damage, breakage and deformation; and the mold being liable to breakage.

Thus, the need for improvement still exists.

SUMMARY OF THE INVENTION

It is therefore one object of the invention to provide a method of microcellular foam molding an article, comprising the steps of (1) filling a mold with a polyolefin compound; (2) forming crosslinks in the mold to obtain a crosslinked mold; (3) dissolving a supercritical fluid into the crosslinked mold under a predetermined pressure and at a predetermined temperature for a predetermined period of time to obtain a second mold configured to allow the supercritical fluid to effuse through; and (4) heating the second mold at a second predetermine temperature for a predetermined foaming time until a foamed article is finished in the second mold.

It is another object of the invention to provide a method of microcellular foam molding an article, comprising the steps of (A) filling a mold with elastomers; (B) dissolving a supercritical fluid into the mold under a predetermined pressure and at a predetermined temperature for a predetermined period of time to obtain a second mold configured to allow the supercritical fluid to effuse through; and (C) heating the second mold at a second predetermine temperature for a predetermined foaming time until a foamed article is finished in the second mold.

Preferably, the polyolefin compound comprises at least one of ethylene-vinyl acetate (EVA), polyolefin elastomer (POE), low-density polyethylene (LDPE), and polypropylene (PP).

Preferably, there is further provided with the sub-step of adding at least one of crosslinking agents, fillers, and chemical additives to the polyolefin compound prior to step (1).

Preferably, the crosslinking agents comprise at least one of daichlorophenols (DCP) and Bis(tert-butylperoxy isopropyl) benzene (BIPB); the fillers comprise at least one of calcium carbonate, pulvistalci, zinc oxide, and titanium dioxide; and the chemical additive comprises at least one of paraffin and stearic acid.

Preferably, the polyolefin compound having 100 phr, the crosslinking agents have less than 1.2 phr, the fillers have less than 20 phr, and the chemical additives have less than 5 phr.

Preferably, in step (2) electron beam irradiation of 20-50 kGy is applied to form crosslinks in the mold.

Preferably, the supercritical fluid is carbon dioxide or nitrogen.

Preferably, the predetermined pressure is in 15-35 MPa range, the predetermined temperature is in 40-150° C. range, and the predetermined period of time is 0.5-8 hours.

Preferably, the second predetermine temperature is between 60° C. and 200° C., and the predetermined foaming time is between 5 minutes and 60 minutes.

Preferably, the elastomers comprise at least one of thermoplastic polyurethane (TPU), thermoplastic polyester elastomer (TPEE), and Pebax® thermoplastic elastomer.

The invention has the following advantageous effects in comparison with the prior art: the formed article is produced in one process with a great reduction of the manufacturing cost. The foamed article has a specific gravity of less than 0.35. The foamed article has many applications including mats, shoes, exercise equipment, toys and packing materials. The foamed article causes no pollution to the environment and has excellent resilience and smooth surfaces. Finally, the step of foaming by heating saves material and prevents components from being damaged.

The above and other objects, features and advantages of the invention will become apparent from the following detailed description taken with the accompanying drawings.

DETAILED DESCRIPTION OF THE INVENTION

Figure 1:
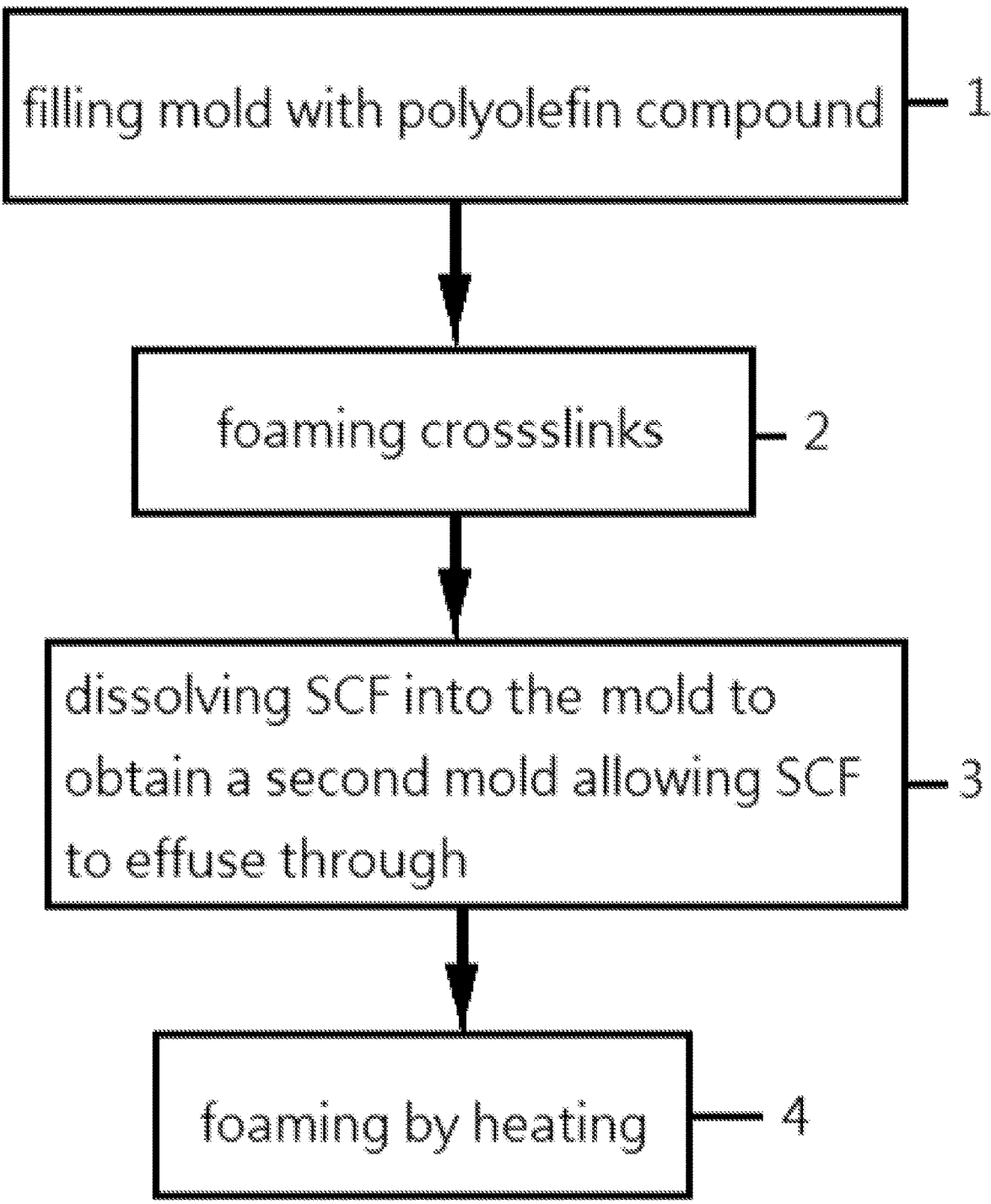
FIG. 1 is a flow chart of a method of microcellular foam molding according to a first preferred embodiment of the invention.

Referring to FIG. 1, a flow chart of a method of microcellular foam molding in accordance with a first preferred embodiment of the invention is illustrated by comprising the following steps as discussed in detail below.

Step 1: filling a mold with a polyolefin compound comprising at least one of ethylene-vinyl acetate (EVA), polyolefin elastomer (POE), low-density polyethylene (LDPE), and polypropylene (PP). In a first example, EVA is taken as the polyolefin having a 5%-40% mole. In a second example, a combination of EVA and POE having a composition ratio of 100/0.1-0.1/100 is taken as the polyolefin. In a secondfirst example, a combination of EVA, POE, and ethylene propylene diene monomer (EPDM) rubber having a composition ratio of 100/0.1/0.1-0.1/100/20.

Crosslinking agent, filler, and chemical additive can be added to the polyolefin compound. Crosslinking agent, filler, and chemical additive are added to the polyolefin compound to completely mix in a mixing device (e.g., extrusion machine). The crosslinking agent reacts with molecules of the polyolefin compound to form bridges between polymer molecular links and in turn form an insolvable substance having a three-dimensional structure. The filler can improve performance or reduce production costs. The chemical additive can increase flowability. For the polyolefin compound having 100 parts per hundred rubber (phr), the crosslinking agent has less than 1.2 phr (e.g., 0.15 phr-1.1 phr or preferably 0.25 phr-1.0 phr), the filler has less than 20 phr, and the chemical additive has less than 5 phr.

Crosslinking agent comprises peroxide. For example, the crosslinking agent comprises at least one of daichlorophenols (DCP) and Bis(tert-butylperoxy isopropyl) benzene (BIPB).

Filler comprises at least one of calcium carbonate, pulvistalci, zinc oxide and titanium dioxide.

Chemical additive comprises at least one of paraffin and stearic acid.

Injection molding machine or extrusion machine is used to fill a mold with the polyolefin compound. The mold is not limited to a specific shape. For example, the mold can be flat or particle shaped.

The filling of mold is done at specific conditions. For example, with respect to the polyolefin compound, molding temperature is in the range of 160–180° C., and molding pressure is 10 Mpa, and molding time is 400-550 seconds.

Step 2: Crosslinking is formed in the mold to obtain a crosslinked mold.

After forming the mold, for increasing the linking strength of the molecules of the polyolefin compound, crosslinking is formed in the mold by chemical reactions that are initiated by hat, pressure, or electron beam irradiation. As a result, a crosslinked mold is obtained. For example, the mold is heated at 170-180° C. to form crosslinks therein. Specifically, the added crosslinking agent causes the molecules of the polyolefin compound to form crosslinks. A vulcanization curve may show the increase in viscosity of the polyolefin compound during crosslinking. Alternatively, electron beam irradiation of 20-50 kGy is applied to form crosslinks in the polyolefin compound.

Step 3: Dissolving gas under high pressure (i.e., a supercritical fluid (SCF)) into the crosslinked mold to obtain a mold which allows a supercritical fluid to effuse through. In detail, gas under high pressure (i.e., SCF) is dissolved into the crosslinked mold and has its pressure decreased to the atmospheric pressure to obtain a mold which allows a supercritical fluid to effuse through.

Examples of the SCF are carbon dioxide and nitrogen.

The high pressure is in 15-35 MPa range, the temperature is in 30-150° C. range, and the crosslinking process takes 0.5-8 hours. Preferably, the high pressure is in 15-35 MPa range, the temperature is in 40-150° C. range, and the crosslinking process takes 1-5 hours.

The high pressure decreased to the atmospheric pressure takes 15-40 minutes for the sakes of improving performance and controlling prefoaming. The prefoaming ratio is in 1-1.4 range in which one represents no prefoaming.

In the forming of the mold allowing a SCF to effuse through, the effusion amount of the SCF is between 0.6 w % and 15 w %, or preferably between 0.8 w % and 10 w %.

Step 4: placing the mold allowing a SCF to effuse through in a heater and activating the heater to heat the mold until a foamed article is finished in the mold allowing a SCF to effuse through. In detail, placing the mold allowing a SCF to effuse through in a heater and activating the heater to heat the mold until a foamed article is finished in the mold allowing a SCF to effuse through in one manufacturing step.

For example, the mold allowing a SCF to effuse through in a microwave oven and activating the microwave oven to heat the mold until a foamed article is finished in the mold allowing a SCF to effuse through.

Foaming conditions are temperature between 60° C. and 200° C., and foaming time between 5 minutes and 60 minutes.

The foamed article contains billions of tiny bubbles having a size from 0.1 to 3 micrometers and the bubbles have a specific gravity of 0.03-0.30 g/cm$^3$.

In one experiment, the foamed article undergoes three fatigue tests repeatedly with a load of 10-80 kg. It is found that its stability is increased by 30% in comparison with the article made by a conventional EVA foaming material.

The foamed article has a bouncing capability of at least 50% by testing with a ball free falling test based on ASTM D2632. Also, the bouncing capability can be maintained for 10 to 60 days in comparison with the article made by a conventional EVA foaming material. This 10 to 60 days period is increased by 30% in comparison with that of the article made by a conventional EVA foaming material.

The foamed article has many applications including mats, shoes, exercise equipment, toys and packing materials.

The foaming materials have advantages including low specific gravity, no pollution to the environment, excellent resilience, and smooth surface. The formed article is produced in one process with a great reduction of the manufacturing cost. Finally, the step of foaming by heating saves material and prevents components from being damaged.

Figure 2:
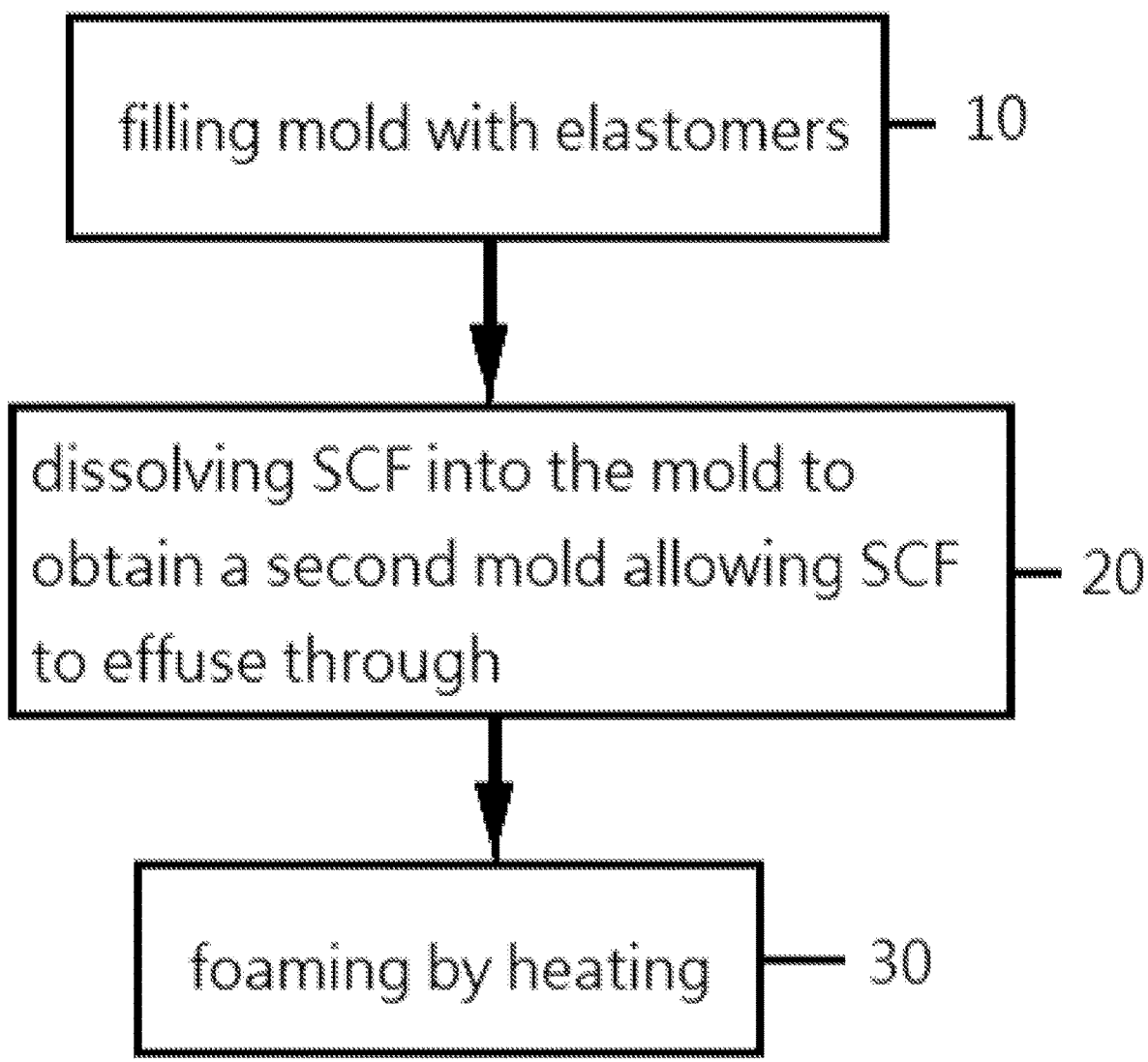
FIG. 2 is a flow chart of a method of microcellular foam molding according to a second preferred embodiment of the invention.

Referring to FIG. 2, a flow chart of a method of microcellular foam molding in accordance with a second preferred embodiment of the invention is illustrated by comprising the following steps as discussed in detail below.

Step 10: filling a mold with elastomers comprising at least one of thermoplastic polyurethane (TPU), thermoplastic polyester elastomer (TPEE), and Pebax® thermoplastic elastomer.

Injection molding machine or extrusion machine is used to fill a mold with the elastomers. The mold is not limited to a specific shape. For example, the mold can be flat or particle shaped.

Step 20: dissolving gas under high pressure (i.e., SCF) into the mold to obtain a mold which allows a SCF to effuse through. In detail, gas under high pressure (i.e., SCF) is dissolved into the mold and has its pressure decreased to the atmospheric pressure to obtain a mold which allows a SCF to effuse through.

Examples of the SCF are carbon dioxide and nitrogen.

The high pressure is in 15-35 MPa range, the temperature is in 30-150° C. range, and the crosslinking process takes 0.5-8 hours. Preferably, the high pressure is in 15-35 MPa range, the temperature is in 40-150° C. range, and the crosslinking process takes 1-5 hours.

The high pressure decreased to the atmospheric pressure takes 15-40 minutes for the sakes of improving performance and controlling prefoaming. The prefoaming ratio is in 1-1.4 range in which one represents no prefoaming.

In the forming of the mold allowing a SCF to effuse through, the effusion amount of the SCF is between 0.6 w % and 15 w %, or preferably between 0.8 w % and 10 w %.

Step 30: placing the mold allowing a SCF to effuse through in a heater and activating the heater to heat the mold until a foamed article is finished in the mold allowing a SCF to effuse through. In detail, placing the mold allowing a SCF to effuse through in a heater and activating the heater to heat the mold until a foamed article is finished in the mold allowing a SCF to effuse through in one manufacturing step.

For example, the mold allowing a SCF to effuse through in a microwave oven and activating the microwave oven to heat the mold until a foamed article is finished in the mold allowing a SCF to effuse through.

Foaming conditions are temperature between 60° C. and 200° C., and foaming time between 5 minutes and 60 minutes.

The foamed article contains billions of tiny bubbles having a size from 0.1 to 3 micrometers and the bubbles have a specific gravity of 0.03-0.30 g/cm$^3$.

In one experiment, the foamed article undergoes three fatigue tests repeatedly with a load of 10-80 kg. It is found that its stability is increased by 30% in comparison with the article made by a conventional EVA foaming material.

The foamed article has a bouncing capability of at least 50% by testing with a ball free falling test based on ASTM D2632. Also, the bouncing capability can be maintained for 10 to 60 days in comparison with the article made by a conventional EVA foaming material. This 10 to 60 days period is increased by 30% in comparison with that of the article made by a conventional EVA foaming material.

The foamed article has many applications including mats, shoes, exercise equipment, toys and packing materials. For example, a shoe produced by the method of the second preferred embodiment of the invention has a specific gravity of 0.05-0.3, an average diameter of the bubbles in the shoe is 0.01-3.0 µm, and the bouncing capability of the shoe is more than 50% based on ASTM 02632. In another example, a mat produced by the method of the second preferred embodiment of the invention has a specific gravity of 0.03-0.2, an average diameter of the bubbles in the shoe is 0.01-3.0 µm, and the bouncing capability of the shoe is more than 50% based on ASTM 02632.

The foaming materials have advantages including low specific gravity, no pollution to the environment, excellent resilience, and smooth surfaces. The formed article is produced in one process with a great reduction of the manufacturing cost. Finally, the step of foaming by heating saves material and prevents components from being damaged.

Embodiment 1

EVA of 100 phr and having 26% mole, calcium carbonate of 1 phr, paraffin of 0.5 phr, and DCP of 0.5 phr are added to a mixer to mix for 12 minutes under conditions of 100° C. and 0.75 Mpa. Then the mixture is sent to an extrusion machine to produce plastic granules. The granules are sent to an EVA injection molding machine to heat at 180° C. for melting and forming crosslinks in the molten polyolefin compound in the mold. Next, the mold having the crosslinked polyolefin compound is sent to a pressurized vessel with a SCF (e.g., carbon dioxide) being introduced. The vessel is heated at 50° C. and kept at 40 Mpa for 2 hours. Next, the internal pressure of the vessel is decreased to the atmospheric pressure in 30 minutes. As such, a mold allowing an SCF to effuse through is obtained, it has a foaming ratio of at least 1.5, and it has an effusion amount of the SCF of 10 w %. The mold allowing an SCF to effuse through is placed in a heater for foaming at 80° C. for 20 minutes. As a result, a foamed article having a smooth surface is finished.

Bubbles of the finished foamed article are measured by an optical microscope, and density thereof is measured by a specific gravity scale. Bouncing capability of the finished foamed article is tested based on ASTM D2632: a conic steel ball having weight of 28±0.5 g free falls on a sample of foaming plastic from a height of 400 mm in which the ratio of a bouncing height of the steel ball to 400 mm is the bouncing capability of the finished foamed article.

The finished foamed article has a specific gravity of 0.15-0.17, an average diameter of the bubbles in the finished foamed article is 0.8-2.5 µm, and the bouncing capability of the finished foamed article is 55%.

Embodiment 2

EVA is replaced by a compound of EVA (60%)/POE (40%) in which ethenyl acetate in the EVA has 5%-40% mole, and POE having a serial number 8150 is produced by Dows Inc. Other manufacturing steps are the same as that of embodiment 1. The finished article is a foamed article.

The finished foamed article has a specific gravity of 0.13, an average diameter of the bubbles in the finished foamed article is 0.5-2.0 µm, and the bouncing capability of the finished foamed article is 60%.

Embodiment 3

EVA is replaced by a compound of EVA (60%)/POE (40%) in which ethenyl acetate in the EVA has 26% mole, and POE having a serial number 8150 is produced by Dows Inc. and carbon dioxide is replaced by nitrogen as SCF. Other manufacturing steps are the same as that of embodiment 1. The finished article is a foamed article.

The finished foamed article has a specific gravity of 0.15, an average diameter of the bubbles in the finished foamed article is 0.5-2.5 µm, and the bouncing capability of the finished foamed article is 58%.

Embodiment 4

EVA is replaced by a compound of TPU having a serial number 85AU10 produced by Sistron Inc. and the steps of mixing and crosslinking are omitted. Other manufacturing steps are the same as that of embodiment 1. The finished article is a foamed article.

The finished foamed article has a specific gravity of 0.28, an average diameter of the bubbles in the finished foamed article is 0.5-1.5 µm, and the bouncing capability of the finished foamed article is 55%.

Embodiment 5

Peroxide crosslinking agent is not used. Other components of the foaming materials are the same as that of embodiment 3. Electron beam irradiation of 20-50 kGy is applied to form crosslinks. Other manufacturing steps are the same as that of embodiment 3. The finished article is a foamed article.

The finished foamed article has a specific gravity of 0.14, an average diameter of the bubbles in the finished foamed article is 0.5-2.5 µm, and the bouncing capability of the finished foamed article is 55%.

Exemplary Example 1

The conventional MuCell® Molding Technology is used in which a SCF foaming device is used to produce TPU foaming articles. Hopper is heated to 210° C. and the mold is heated to 30° C. SCF is introduced to an injection molding machine to mix with molten TPU. The molten TPU mixture is injected into a mold cavity to form. The SCF reacts with the molten TPU mixture to form bubbles in the mold cavity. The finished foamed article has the same size as that of the mold cavity but has irregularities on the surface. The finished foamed article has a specific gravity of 0.4-0.55, an average diameter of the bubbles in the finished foamed article is 0.8-2.0 µm, and the bouncing capability of the finished foamed article is 50%.

Exemplary Example 2

Except the prefoaming ratio greater than 1.6 after introducing the SCF, other manufacturing steps are the same as that of embodiment 1. The finished article is a foamed article.

The finished foamed article has a specific gravity of 0.22, an average diameter of the bubbles in the finished foamed article is 0.5-1.7 µm, and the bouncing capability of the finished foamed article is 50%.

Exemplary Example 3

Except the crosslinking agent DCP has 1.25 phr in the embodiment 1, other manufacturing steps are the same as that of embodiment 1. The finished article is a foamed article.

The finished foamed article has a specific gravity of 0.32, an average diameter of the bubbles in the finished foamed article is 0.2-0.8 µm, and the bouncing capability of the finished foamed article is 40%.

Exemplary Example 4

Except the crosslinking agent DCP has 0.12 phr in the Embodiment 1, other manufacturing steps are the same as that of embodiment 1. The finished article is a foamed article.

The finished foamed article has a specific gravity of 0.42, an average diameter of the bubbles in the finished foamed article is 0.2-0.6 µm, and the bouncing capability of the finished foamed article is 35%.

Exemplary Example 5

Except the crosslinking agent DCP has 0.12 phr in the embodiment 2, other manufacturing steps are the same as that of embodiment 2. The finished article is a foamed article.

The finished foamed article has a specific gravity of 0.35, an average diameter of the bubbles in the finished foamed article is 0.1-0.8 µm, and the bouncing capability of the finished foamed article is 42%.

While the invention has been described in terms of preferred embodiments, those skilled in the art will recognize that the invention can be practiced with modifications within the spirit and scope of the appended claims.

What is claimed is:

1. A method of forming a molded microcellular foam article, comprising the steps of:
    (1) filling a mold with a mixture of a polyolefin compound and a crosslinking, agent;
    (2) crosslinking the polyolefin compound in the mold to form a crosslinked polyolefin compound;
    (3) after the step of crosslinking, introducing a supercritical fluid into the mold and dissolving the supercritical fluid into the crosslinked polyolefin compound in the mold under a predetermined pressure and at a first predetermined temperature for a predetermined period of time to form a crosslinked polyolefin compound having the supercritical fluid dissolved therein in the mold; and
    (4) heating the crosslinked polyolefin compound having the supercritical fluid dissolved therein in the mold at a second predetermined temperature for a predetermined foaming time until a finished microcellular foam article is formed in the mold.

2. The method of forming a molded microcellular foam article according to claim 1, wherein in step (3), the predetermined pressure is 15 to 35 MPa, the first predetermined temperature is 40 to 150° C., and the predetermined period of time is 0.5 to 8 hours.

3. The method of forming a molded microcellular foam article according to claim 2, wherein in step (4), the second predetermined temperature is 60 to 200° C., and the predetermined foaming time is 5 to 60 minutes.

4. The method of forming a molded microcellular foam article according to claim 3, wherein the polyolefin compound comprises at least one of ethylene-vinyl acetate (EVA), polyolefin elastomer (POE), low-density polyethylene (LDPE), and polypropylene (PP).

5. The method of forming a molded microcellular foam article according to claim 4, wherein the crosslinking agent comprises at least one of a dichlorophenol (DCP) and Bis(tert-butylperoxy isopropyl) benzene (BIPB), and the mixture further comprises a filler comprising at least one of calcium carbonate, pulvis talci, zinc oxide and titanium dioxide, and a chemical additive comprising at least one of paraffin and stearic acid.

6. The method of forming a molded microcellular foam article according to claim 5, wherein the mixture comprises 100 phr of the polyolefin compound, less than 1.2 phr of crosslinking agent, less than 20 phr of the filler, and less than 5 phr of the chemical additive.

7. The method of forming a molded microcellular foam article according to claim 1,
    wherein the polyolefin compound is ethylene-vinyl acetate (EVA), the mixture comprises 100 phr of the ethylene-vinyl acetate, the crosslinking agent comprises a dichlorophenol (DCP), the mixture comprises 0.5 phr of the dichlorophenol, and the mixture further comprises 1 phr of a calcium carbonate filler and 0.5 phr of a paraffin chemical additive,
    wherein in step (2), the crosslinking is carried out under heating at 180° C. in the mold,
    wherein in step (3), the supercritical fluid is carbon dioxide, the predetermined pressure is 40 MPa, the first predetermined temperature is 50° C., and the predetermined period of time is 2 hours,
    wherein after step (3), pre-foaming is carried out by decreasing a pressure in the mold to atmospheric pressure in 30 minutes, wherein in step (4), the second predetermined temperature is 80° C. and the predetermined foaming time is 20 minutes, whereby the finished microcellular foam article has a smooth surface, a specific gravity of 0.15 to 0.17, bubbles with an average diameter of 0.8 to 2.5 μm, and a bouncing capability of 55%.

\* \* \* \* \*